(12) United States Patent
Matsushita et al.

(10) Patent No.: US 12,379,220 B2
(45) Date of Patent: Aug. 5, 2025

(54) INFORMATION PROCESSING APPARATUS, INFORMATION PROCESSING METHOD, AND NON-TRANSITORY COMPUTER READABLE MEDIUM

(71) Applicant: TOYOTA JIDOSHA KABUSHIKI KAISHA, Toyota (JP)

(72) Inventors: Makoto Matsushita, Ichinomiya (JP); Hiroe Fukui, Toyohashi (JP); Naoki Uenoyama, Kasugai (JP); Hikaru Gotoh, Nagoya (JP); Satoshi Komamine, Nagoya (JP); Takanori Sasano, Toyota (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 311 days.

(21) Appl. No.: 18/107,362

(22) Filed: Feb. 8, 2023

(65) Prior Publication Data

US 2023/0251102 A1    Aug. 10, 2023

(30) Foreign Application Priority Data

Feb. 9, 2022    (JP) ................................. 2022-019065

(51) Int. Cl.
*G01C 21/00* (2006.01)
*G01C 21/34* (2006.01)

(52) U.S. Cl.
CPC ..... *G01C 21/3492* (2013.01); *G01C 21/3469* (2013.01)

(58) Field of Classification Search
CPC  G01C 21/3492; G01C 21/3469; G01C 21/20; G01C 21/34; G01C 21/00; G05D 1/0246; G05D 1/0282; G05D 1/0219; G06Q 10/047
USPC ........................................................ 701/537
See application file for complete search history.

(56) References Cited

U.S. PATENT DOCUMENTS

| | | | | |
|---|---|---|---|---|
| 2007/0294029 A1* | 12/2007 | D'Andrea | ............ | G01C 21/005 |
| | | | | 701/410 |
| 2019/0137278 A1* | 5/2019 | Sakuma | .................. | G01C 21/20 |
| 2020/0293063 A1* | 9/2020 | Aisu | ..................... | G05D 1/0297 |
| 2020/0394405 A1* | 12/2020 | Fukui | ........................ | B25J 13/00 |
| 2021/0116924 A1* | 4/2021 | Etou | ..................... | G05D 1/0212 |
| 2021/0339647 A1* | 11/2021 | Batir | ....................... | B60L 53/51 |
| 2022/0291689 A1* | 9/2022 | Baba | ..................... | G05D 1/0217 |

FOREIGN PATENT DOCUMENTS

| | | |
|---|---|---|
| JP | 2009157615 A | 7/2009 |
| JP | 2016008141 A | 1/2016 |
| JP | 2019-086430 A | 6/2019 |
| JP | 2020-060563 A | 4/2020 |
| JP | 2021-062968 A | 4/2021 |
| JP | 2021174292 A | 11/2021 |
| JP | 2022021896 A | 2/2022 |
| WO | 2019116643 A1 | 12/2020 |

* cited by examiner

*Primary Examiner* — Shardul D Patel
(74) *Attorney, Agent, or Firm* — Dinsmore & Shohl LLP

(57) ABSTRACT

An information processing apparatus includes a controller configured to generate a travel route for a mobile object based on information about people in a range of influence that includes the travel route.

17 Claims, 4 Drawing Sheets

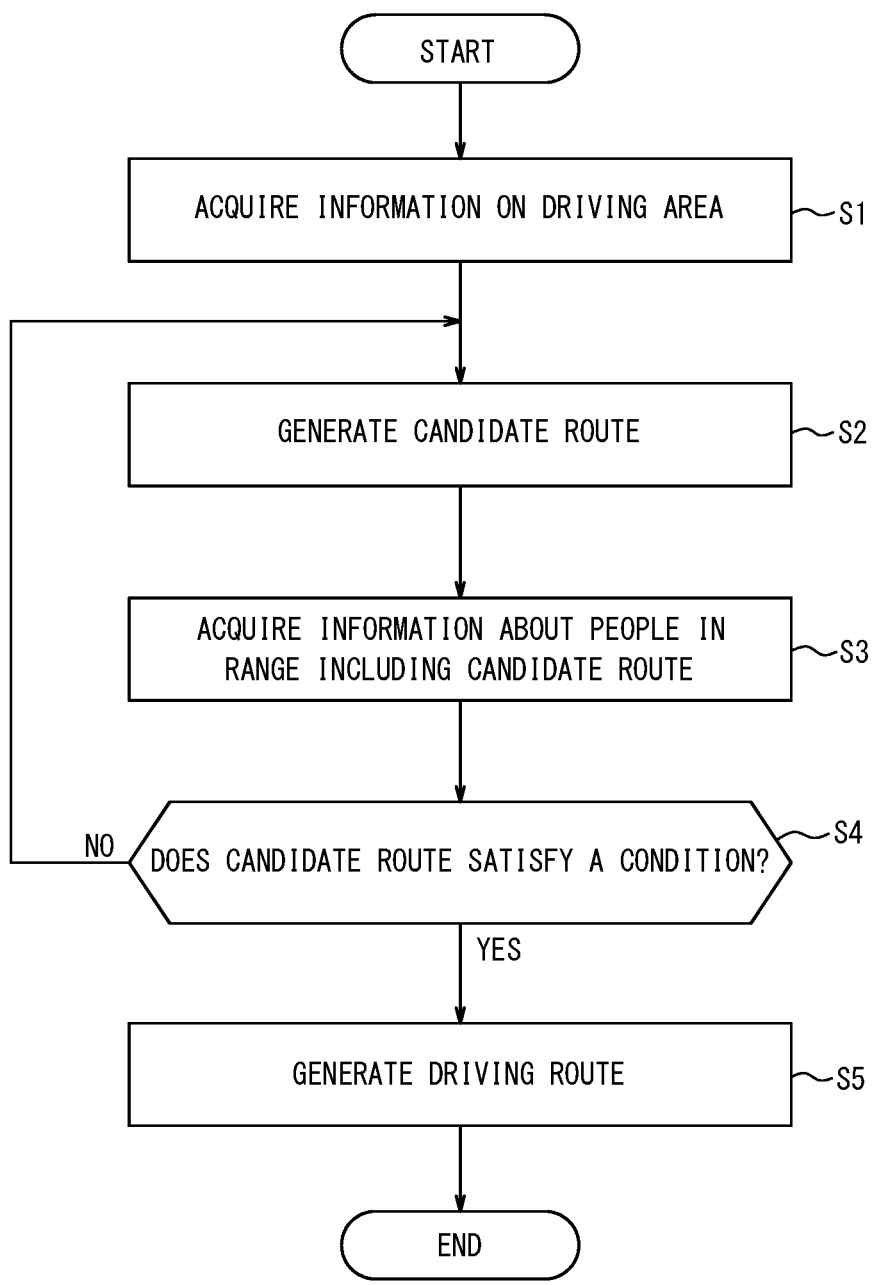

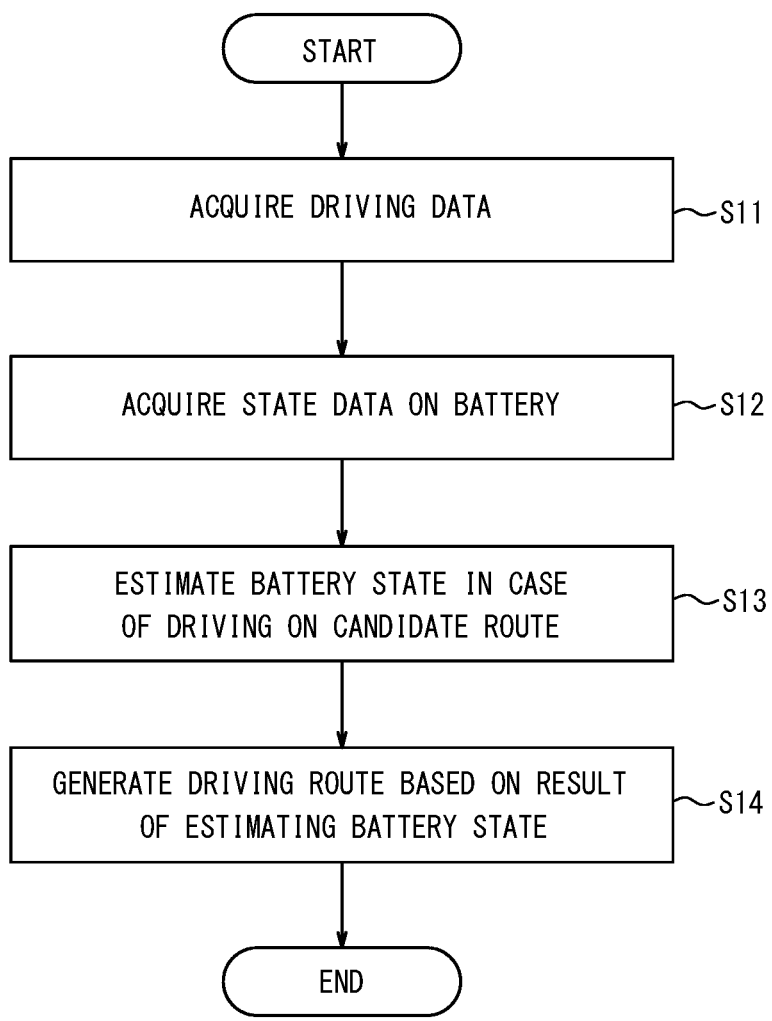

INFORMATION PROCESSING APPARATUS, INFORMATION PROCESSING METHOD, AND NON-TRANSITORY COMPUTER READABLE MEDIUM

CROSS-REFERENCE TO RELATED APPLICATION

This application claims priority to Japanese Patent Application No. 2022-19065, filed on Feb. 9, 2022, the entire contents of which are incorporated herein by reference.

TECHNICAL FIELD

The present disclosure relates to an information processing apparatus, an information processing method, and a non-transitory computer readable medium.

BACKGROUND

Methods for planning vehicle routes taking road congestion into consideration are known. For example, see Patent Literature (PTL) 1.

CITATION LIST

Patent Literature

PTL 1: JP 2020-60563 A

SUMMARY

The convenience of mobile objects can also be reduced by non-vehicle influences, such as pedestrians.

It would be helpful to improve the convenience of mobile objects.

An information processing apparatus according to an embodiment of the present disclosure includes a controller configured to generate a travel route for a mobile object based on information about people in a range of influence that includes the travel route.

An information processing method according to an embodiment of the present disclosure includes generating a travel route for a mobile object based on information about people in a range of influence that includes the travel route.

A non-transitory computer readable medium according to an embodiment of the present disclosure stores an information processing program. The information processing program is configured to cause an information processing apparatus to generate a travel route for a mobile object based on information about people in a range of influence that includes the travel route.

According to the information processing apparatus, the information processing method, and the non-transitory computer readable medium of embodiments of the present disclosure, the convenience of mobile objects can be improved.

BRIEF DESCRIPTION OF THE DRAWINGS

In the accompanying drawings:

FIG. 3 is a flowchart illustrating an example procedure for an information processing method according to an embodiment; and FIG. 4 is a flowchart illustrating an example procedure for evaluating a candidate route.

DETAILED DESCRIPTION (Example Configuration of Information Processing System 1)

Figure 1:
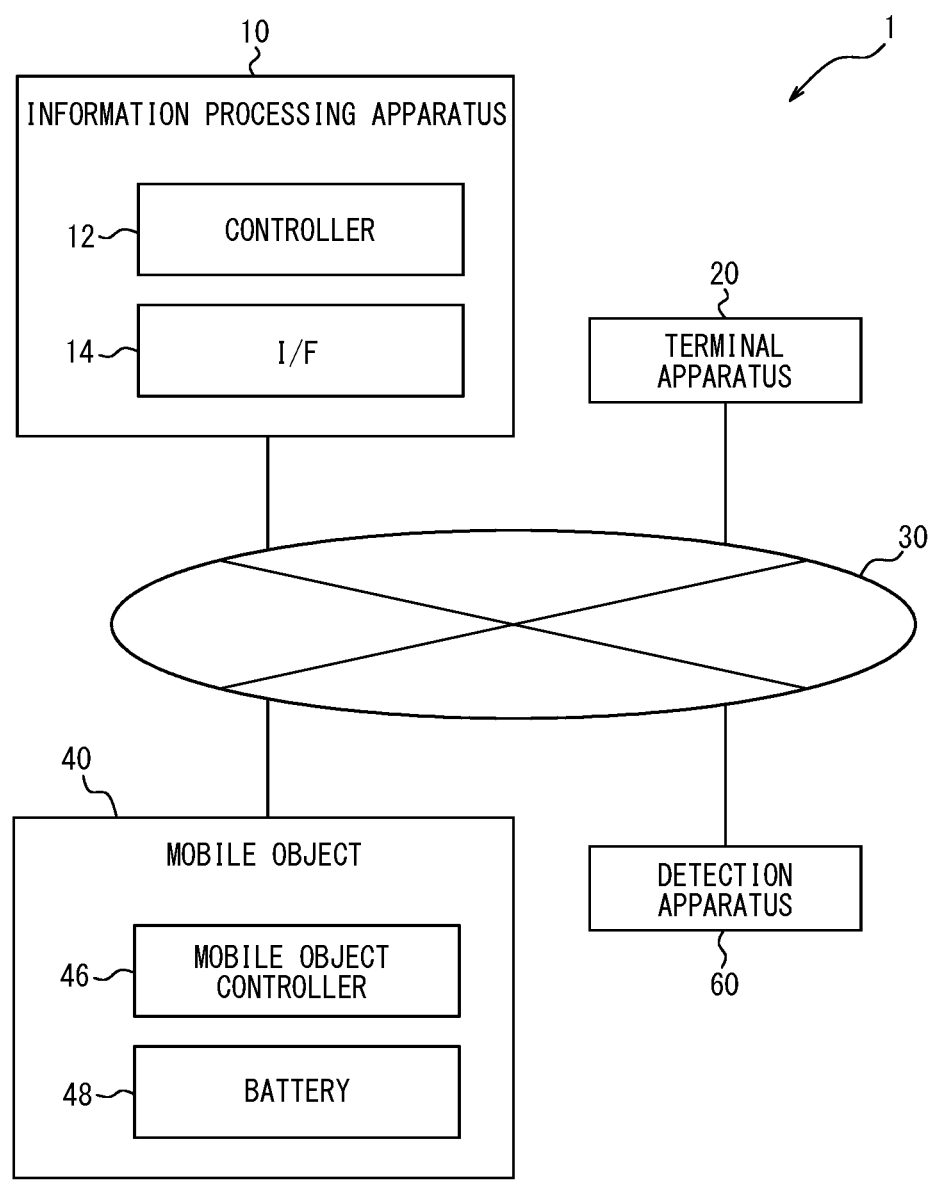
FIG. 1 is a block diagram illustrating an example configuration of an information processing system according to an embodiment.

As illustrated in FIG. 1, an information processing system 1 according to an embodiment includes an information processing apparatus 10, a mobile object 40, and a detection apparatus 60. The mobile object 40 stores delivery articles 50 (see FIG. 2) and travels from the delivery source to the delivery destination of the delivery articles 50. The information processing apparatus generates a driving route for the mobile object 40 to store the delivery articles 50 at the delivery source and deliver the delivery articles 50 to the delivery destination.

Figure 2:
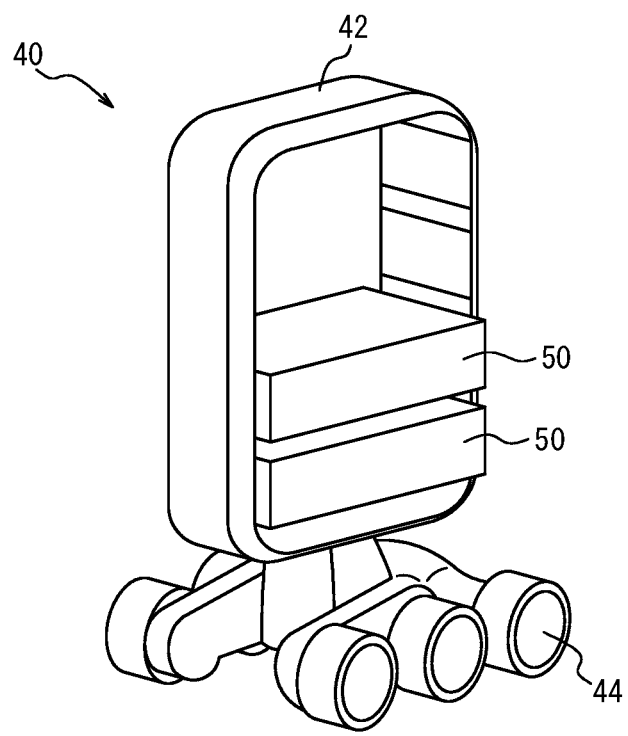
FIG. 2 is a schematic diagram illustrating an example configuration of a mobile object.

The mobile object 40 is not limited to the vehicle illustrated in FIG. 2 but may be configured in various forms, such as a robot or drone. The mobile object 40 can be considered as traveling from the delivery source to the delivery destination. In this case, the driving route can also be referred to as a travel route. The mobile object 40 is not limited to being used to deliver the delivery articles 50. The mobile object 40 may be configured for use in applications other than delivery applications. Therefore, the travel route of the mobile object 40 is not limited to a route from the delivery source to the delivery destination but can be generated as various other routes.

The mobile object 40 travels while being affected by various objects on its driving route, such as other vehicles or people. The information processing system 1 generates a driving route taking into consideration the effect on the mobile object 40. A specific example configuration of the information processing system 1 will be described below.

<Information Processing Apparatus 10>

The information processing apparatus 10 includes a controller 12 and an interface 14. The interface 14 is also referred to as an I/F 14.

The controller 12 controls at least one component of the information processing apparatus 10. The controller 12 may be configured to include at least one processor. The "processor" is a general purpose processor, a dedicated processor specialized for specific processing, or the like in the present embodiment but is not limited to these. The controller 12 may be configured to include at least one dedicated circuit. The dedicated circuit may include, for example, a field-programmable gate array (FPGA) or an application specific integrated circuit (ASIC). The controller 12 may be configured with the dedicated circuit instead of the processor, or may be configured with the dedicated circuit along with the processor.

The information processing apparatus 10 may further include a memory. The memory is a semiconductor memory, a magnetic memory, an optical memory, or the like, for example, but is not limited to these. The memory may function, for example, as a main memory, an auxiliary memory, or a cache memory. The memory may include an electromagnetic storage medium, such as a magnetic disk. The memory may include a non-transitory computer readable medium. The memory stores any information to be used for the operations of the information processing apparatus 10. For example, the memory may store a system program, an application program, or the like. The memory may be included in the controller 12.

Information, data, or the like is outputted from and inputted to the controller 12 through the I/F 14. The I/F 14 may include a communication module for communication with other devices, such as the mobile object 40 or the terminal apparatus 20, via a network 30. The communication module may be, for example, compliant with a mobile communication standard, such as the 4th Generation (4G) standard or the 5th Generation (5G) standard. The communication module may be compliant with a communication standard, such as a Local Area Network (LAN). The communication module may be compliant with a wired or wireless communication standard. The communication module is not limited to these examples and may be compliant with various communication standards. The I/F 14 may be configured to be connected to the communication module.

The I/F 14 may be configured with an input device for receiving inputs, such as information or data, from a user. The input device may be configured with, for example, a touch panel, a touch sensor, or a pointing device such as a mouse. The input device may be configured with a physical key. The input device may be configured with an audio input device, such as a microphone.

The I/F 14 may be configured with an output device that outputs information, data, or the like to the user. The output device may include, for example, a display device that outputs visual information, such as images, characters, or graphics. The display device may be configured with, for example, a Liquid Crystal Display (LCD), an organic or inorganic Electro-Luminescent (EL) display, a Plasma Display Panel (PDP), or the like. The display device is not limited to the above displays and may be configured with various other types of displays. The display device may be configured with a light emitting device, such as a Light Emitting Diode (LED) or a Laser Diode (LD). The display device may be configured with various other devices. The output device may include, for example, an audio output device, such as a speaker, that outputs audio information, such as voice. The output device is not limited to the above examples and may include various other devices.

The information processing apparatus 10 may include a single server apparatus or a plurality of server apparatuses capable of communicating with each other.

<Mobile Object 40>

As illustrated in FIG. 2, the mobile object 40 includes a body 42, with a storage space for storing delivery articles 50, and a driver 44 for moving the mobile object 40.

The storage space of the body 42 may be configured to store delivery articles 50 packed in delivery boxes or the like or may be configured to store delivery articles 50 that are not packed in delivery boxes or the like. The body 42 may be equipped with a locking mechanism configured to lock the delivery articles 50 stored in the storage space. The body 42 may have an opening for loading and unloading the delivery articles 50 onto and off the storage space. The body 42 may have an entrance and exit, including a door or shutter that opens when delivery articles 50 are loaded onto or unloaded off the storage space.

The driver 44 may, for example, include wheels or caterpillars as a mechanism for traveling on a road surface. The driver 44 may further include a drive mechanism such as a motor or engine that drives the wheels, caterpillars, or the like. The driver 44 may further include components such as gears that transmit power from the drive mechanism to the wheels, caterpillars, or the like. The driver 44 may further include a battery 48 (see FIG. 1) to supply power or a tank to supply fuel to the drive mechanism. In the present embodiment, the mobile object 40 is provided with the battery 48. The driver 44 is assumed to be configured by a motor that operates on power from the battery 48.

The mobile object 40 may further include a non-essential mobile object controller 46. The mobile object controller 46 controls at least one component of the mobile object 40, such as the body 42 or driver 44 of the mobile object 40. The mobile object controller 46 may acquire destination information specifying a destination from the information processing apparatus 10 and control the driver 44 to travel autonomously based on the destination information. The mobile object 40 may acquire control information indicating the timing at which to start or stop traveling, the travel speed, or the like from the information processing apparatus 10 and control the driver 44 to travel based on the control information. In a case in which a delivery article 50 is stored in the body 42, the mobile object controller 46 may output information identifying the stored delivery article 50 to the information processing apparatus 10. In a case in which a delivery article 50 is removed from the body 42, the mobile object controller 46 may output information identifying the removed delivery article 50 to the information processing apparatus 10.

The mobile object controller 46 may be configured to include at least one processor. The mobile object controller 46 may be configured to include one or more dedicated circuits instead of the processor, or may be configured to include a dedicated circuit along with the processor. The mobile object 40 may be configured to include a memory. The memory of the mobile object 40 may be configured to be identical or similar to the memory of the information processing apparatus 10. The mobile object 40 may be configured to include an I/F or a communication module. The I/F or communication module of the mobile object 40 may be configured to be identical or similar to the I/F or communication module of the information processing apparatus 10.

The mobile object 40 may be configured to include a positional information detector that acquires the positional information for the mobile object 40 itself. The mobile object 40 may output the positional information for the mobile object 40 itself to the information processing apparatus 10. The positional information detector may be configured to include a receiver compliant with a satellite positioning system. The receiver compliant with the satellite positioning system may include, for example, a Global Positioning System (GPS) receiver.

The mobile object 40 may be provided with a sensor that detects objects around the mobile object 40. The mobile object controller 46 may slow down or stop the mobile object 40 based on the result of detecting objects around the mobile object 40. In other words, the mobile object 40 may drive autonomously according to the surrounding conditions.

The number of mobile objects 40 managed by the information processing system 1 may be two or more. The mobile object 40 is not limited to the configuration illustrated in FIG. 2 but may be configured in a variety of other ways to store the delivery article 50 and move.

<Detection Apparatus 60>

The detection apparatus 60 detects information on the area in which the mobile object 40 drives and outputs the information to the information processing apparatus 10. The information about the area in which the mobile object 40 drives may, for example, include the attributes, position, or number of pedestrians present in the area, or the attributes, position, or number of other objects, such as vehicles. The information on the area in which the mobile object 40 drives may, for example, include data on roads, topography, buildings, or the like. The information on pedestrians, vehicles, or the like present in the area where the mobile object 40 drives can change over a short period of time. The information processing apparatus 10 may acquire the information on pedestrians, vehicles, or the like present in the area where the mobile object drives at any appropriate timing from the detection apparatus 60 or may acquire the information as statistically processed big data. The data on roads, topography, buildings, or the like is unlikely to change in a short period of time. The information processing apparatus 10 may acquire data or information that is unlikely to change in a short period of time from the detection apparatus 60 at any appropriate timing or may acquire the data or information in advance from the detection apparatus 60 or another apparatus.

The detection apparatus 60 may include a camera that captures images of the area in which the mobile object 40 is driving. The detection apparatus 60 may acquire information about the area in which the mobile object 40 is driving based on the images captured by the camera. The detection apparatus 60 may be configured to emit electromagnetic waves into the surrounding area and detect the electromagnetic waves that are reflected back. The detection apparatus 60 may obtain information about the area in which the mobile object 40 is driving based on the result of detecting the electromagnetic waves that are reflected back. The detection apparatus 60 is not limited to these examples and may acquire information about the area in which the mobile object 40 drives in various ways.

The detection apparatus 60 is installed in the area where the mobile object 40 drives. The detection apparatus 60 may be installed in the area where the delivery source or delivery destination is located. The detection apparatus 60 may be installed in an area that includes a route that is assumed to be the route between the delivery source and the delivery destination.

<Terminal Apparatus 20>

The information processing system 1 further includes a non-essential terminal apparatus 20. The terminal apparatus 20 may accept input of information, from the user who ships the delivery article 50, specifying the place or time to ship the delivery article 50 and may output the inputted information to the information processing apparatus 10. The terminal apparatus may accept input of information, from the user who receives the delivery article 50, specifying the place or time to receive the delivery article 50 and may output the inputted information to the information processing apparatus 10. The terminal apparatus 20 may acquire information about the delivery status of the delivery article 50 from the information processing apparatus 10 and notify the user who shipped the delivery article 50 or the user who is to receive the delivery article 50 of the delivery status of the delivery article 50.

The terminal apparatus 20 may be configured to include one or more processors or one or more dedicated circuits. The terminal apparatus 20 may be configured to include a memory. The memory of the terminal apparatus 20 may be configured to be identical or similar to the memory of the information processing apparatus 10. The terminal apparatus 20 may be configured to include an I/F or a communication module. The I/F or communication module of the terminal apparatus 20 may be configured to be identical or similar to the I/F or communication module of the information processing apparatus 10.

The terminal apparatus 20 may be configured to include an input device for receiving inputs, such as information or data, from the user. The input device may be configured to include the various devices described as the I/F 14. The terminal apparatus 20 may be configured to include an output device that outputs information, data, or the like to the user. The output device may be configured to include the various devices described as the I/F 14.

The number of terminal apparatuses 20 included in the information processing system 1 is not limited to one and may be two or more. The terminal apparatus 20 may be configured by a mobile terminal, such as a smartphone or a tablet, or a Personal Computer (PC), such as a notebook PC or a tablet PC. The terminal apparatus 20 is not limited to the above examples and may include various devices.

(Operation Example of Information Processing System 1)

In the information processing system 1 according to the present embodiment, the controller 12 of the information processing apparatus 10 generates a driving route for the mobile object 40 so that the mobile object 40 can store delivery articles 50 at the delivery source and deliver the delivery articles 50 to the delivery destination. In a case in which the mobile object 40 is not storing any delivery articles 50 or has the capacity to store another delivery article 50, the controller 12 designates the delivery source of the delivery article 50 as the destination of the mobile object 40 so that the mobile object 40 stores the delivery article 50. In a case in which the mobile object 40 has stored the delivery article 50, the controller 12 designates the delivery destination of the delivery article 50 as the destination of the mobile object 40 so that the mobile object 40 delivers the stored delivery article 50.

The delivery source includes the location from which the delivery article 50 is shipped. The delivery article 50 may be shipped from the user, such as a corporation or individual, or from a distribution center or the like that has collected the delivery article 50. The delivery destination includes the location at which the delivery article 50 is to be received. The delivery article 50 may be received by a user, such as a corporation or individual, or by a distribution center or the like that collects the delivery article 50. These examples are not limiting, and the delivery source or destination may include a variety of locations.

The controller 12 generates a driving route for delivery by the mobile object 40. The controller 12 may generate a driving route for the mobile object 40 to travel from one delivery source to one delivery destination. The controller 12 may generate a driving route for the mobile object 40 to travel from one delivery source to a plurality of delivery destinations in order. The controller 12 may generate a driving route for the mobile object 40 to visit a plurality of delivery sources in order and then travel to one delivery destination. The controller 12 may generate a driving route for the mobile object 40 to visit a plurality of delivery sources in order and then travel to a plurality of delivery destinations in order. The controller 12 may generate a driving route for the mobile object 40 to deliver a plurality of delivery articles 50 with different delivery sources or delivery destinations in parallel.

While driving, the mobile object 40 is affected by pedestrians and by other objects, such as vehicles, on or near the driving route. In a case in which the mobile object 40 drives autonomously so as to avoid colliding or coming in contact with pedestrians and the like, the mobile object 40 slows down or stops more frequently as the number of pedestrians or the number of other objects, such as vehicles, that affect the mobile object 40 is greater. As a result, the arrival of the mobile object 40 at the destination is delayed.

The increased frequency of slowing down or stopping of the mobile object 40 can also increase the load on the driver 44 of the mobile object 40. For example, the state of the battery 48 in the mobile object 40 is more likely to deteriorate. Specifically, the rate of charge (SOC: State of Charge) of the battery 48 is more likely to decrease. In addition, the State of Health (SOH) of the battery 48 tends to degrade. The state of health of the battery 48 can also be referred to as the degree of degradation. As the value of SOH is smaller, the state of the battery 48 is worse. The motor, engine, or other components of the driver 44 of the mobile object 40 are also more likely to deteriorate due to acceleration and deceleration. Degradation of the mobile object 40 increases the frequency of maintenance on the mobile object 40 and decreases the utilization rate of the mobile object 40.

As discussed above, the effect on the mobile object 40 during driving reduces the convenience of the mobile object 40. The controller 12 may generate a driving route for the mobile object 40 to reduce the effect on the mobile object 40 during driving. Specifically, the mobile object 40 is likely to be affected during driving by people, such as pedestrians, or other objects, such as vehicles, that are on or within a predetermined distance from the driving route.

When driving autonomously, the mobile object 40 may predict and avoid the movement of surrounding people or objects. The accuracy of prediction of movements by vehicles and the like can be higher than the accuracy of prediction of human movement. As a result, the mobile object 40 is more likely to slow down or stop to avoid people due to an inability to fully predict human movement. In other words, the frequency with which the mobile object 40 slows down or stops can increase due to human influence.

In the present embodiment, the controller 12 generates a driving route for the mobile object 40 by taking into consideration the influence of people on or within a predetermined distance from the driving route of the mobile object 40. The range that is on or within a predetermined distance from the driving route of the mobile object 40 is also referred to as the range of influence. In other words, the controller 12 generates a driving route for the mobile object based on information about people in a range of influence that includes the driving route. The information about people in the range of influence includes information about people who are estimated to be present within a predetermined range in the direction of travel of the mobile object 40 at the time the mobile object 40 is actually scheduled to travel. The information about people may include attributes such as the age group or gender of people, the density or number of people present within a predetermined range, the position or direction of movement of people, or the like.

In the case of generating the driving route for the mobile object 40 based on information about people in the range of influence, the controller 12 may generate a candidate route. The controller 12 may acquire information about people in the range of influence of the candidate route assuming that the mobile object 40 drives the candidate route. The controller 12 may estimate the extent of the influence in a case in which the mobile object 40 drives on the candidate route based on the information about people in the range of influence of the candidate route. The controller 12 may generate the driving route by determining the candidate route as the driving route in a case in which the influence on the mobile object 40 is estimated to be small.

The controller 12 may quantify the extent of the influence on the mobile object 40 in the case of driving on the candidate route. The controller 12 may determine the candidate route as the driving route in a case in which a numerical value representing the extent of the influence is less than a predetermined threshold. The controller 12 may generate a plurality of candidate routes and quantify the extent of the influence on the mobile object in the case of driving on each candidate route. The controller 12 may determine the candidate route for which the numerical value representing the extent of the influence is smallest as the driving route. The controller 12 may narrow down the list to candidate routes for which the numerical value representing the extent of the influence is less than a predetermined threshold and determine the driving route from among the narrowed-down candidate routes based on other indicators.

In the case of determining a driving route from a candidate route, the controller 12 may determine the candidate route as the driving route when the candidate route satisfies a predetermined condition. In other words, the controller 12 may evaluate candidate routes and generate the driving route based on the evaluation results.

The controller 12 may generate a driving route based on the number of people crossing the driving route of the mobile object 40. Specifically, the controller 12 may estimate the number of people crossing the driving route for the mobile object 40 based on information about people in the range of influence. The controller 12 may estimate the number of people crossing the driving route within a predetermined distance in the direction of travel from the position of the mobile object 40.

The controller 12 may estimate the number of people crossing the driving route based on attributes of people. For example, a person walking while looking at a mobile terminal such as a smartphone is likely to cross the driving route, since such a person walks regardless of the movement of the mobile object 40. An inattentive person, such as a child or an elderly person, is also unlikely to notice the movement of the mobile object 40 and is therefore likely to cross the driving route. The controller 12 may estimate the probability of a person crossing the driving route, or the number of people crossing the driving route, taking into consideration these various attributes.

Based on the estimation results, the controller 12 may generate the driving route so that fewer people cross the driving route. In this way, the frequency of slowing down or stopping by the mobile object 40 can be reduced.

The controller 12 may generate a driving route based on the number of people approaching the mobile object 40. Specifically, the controller 12 may estimate the number of people approaching the mobile object 40 based on information about people in the range of influence.

The controller 12 may estimate the number of people approaching the mobile object 40 based on attributes of people. For example, curious people such as children are more likely to approach the mobile object 40. A person with malicious intent to damage or vandalize the mobile object 40 is also likely to approach the mobile object 40. The controller 12 may estimate the probability of a person approaching the mobile object 40, or the number of people approaching the mobile object 40, taking into consideration these various attributes.

Based on the estimation results, the controller 12 may generate the driving route so that fewer people approach the mobile object 40. In this way, the frequency of slowing down or stopping by the mobile object 40 can be reduced.

The mobile object 40 can deteriorate depending on driving conditions. The controller 12 may acquire data on the speed or acceleration of the mobile object 40 while the mobile object 40 is driving, data on the output of the driver 44, or the like as driving data representing the driving status of the mobile object 40. The driving data is also referred to as travel data. As state data on the battery 48 in the mobile object 40, the controller 12 may also acquire data representing the state of the battery 48 by the state of charge, state of health, or the like. Based on the relationship between the driving data and the state data on the battery 48, the controller 12 may generate a driving route for the mobile object 40 so that the state of the battery 48 is less likely to deteriorate. Specifically, the controller 12 may generate the driving route for the mobile object 40 so that the state of charge or state of health of the battery 48 is less likely to deteriorate.

As a result of the mobile object 40 driving, maintenance such as recharging or replacing the battery 48 may become necessary. The controller 12 may generate a candidate route for the mobile object 40 to drive so as to reduce the effect of maintenance, including charging or replacing the battery 48, on delivery. The controller 12 may estimate the timing at which maintenance, such as charging or replacing the battery 48, will become necessary assuming that the mobile object 40 has driven the generated candidate route. The controller 12 may generate the driving route based on the estimation results.

In a case in which a plurality of mobile objects 40 are in operation, a higher frequency of maintenance on a particular mobile object 40 could reduce the operating efficiency of the mobile objects 40. The controller 12 may generate a driving route for each mobile object 40 so as to equalize the state of the battery 48 in each mobile object 40. In this way, the operating efficiency of the mobile object 40 can be maintained.

The state of the battery 48 can change under the influence of the ambient temperature. For example, in a case in which the temperature of the battery 48 decreases, the amount of charge that the battery 48 is capable of discharging decreases. In other words, the state of charge of the battery 48 is substantially reduced. The controller 12 may generate a driving route based on the temperature along the driving route of the mobile object 40. Specifically, the controller 12 may acquire a forecast of the ambient temperature around the mobile object 40 at the time the mobile object 40 is actually scheduled to drive. The controller 12 may correct the relationship between the driving data on the mobile object 40 and the state data on the battery 48 based on the forecasted temperature. The controller 12 may generate the driving route based on the corrected relationship. In this way, the accuracy of estimating the state of the battery 48 can be improved.

By accumulation of data representing the relationship between the driving data on the mobile object 40 within a predetermined area and the state data on the battery 48, the accuracy of estimating the state of the battery 48 when the mobile object 40 travels within the predetermined area can be improved. The controller 12 may generate a driving route through a predetermined area and cause the mobile object 40 to drive on that driving route to acquire data representing the relationship between the driving data on the mobile object 40 and the state data on the battery 48 when the mobile object drives through the predetermined area. The controller 12 may cause the mobile object 40 to drive on the driving route through the predetermined area a plurality of times to increase the amount of data representing the relationship between the driving data on the mobile object 40 and the state data on the battery 48.

In a case in which the mobile object 40 delivers a delivery article 50 in a predetermined area, if the state of the battery 48 is poor, maintenance could become necessary along the way, preventing the mobile object 40 from completing the delivery. The controller 12 may estimate the state of the battery 48 required for the mobile object 40 to deliver the delivery article 50 in a predetermined area and generate the driving route based on the result of estimation. Specifically, the controller 12 may generate a driving route that enables the mobile object 40 to complete the delivery with the current state of the battery 48. In this way, the probability of the mobile object 40 failing to complete the delivery is reduced. Consequently, the convenience of the mobile object 40 is improved.

In a case in which the mobile object 40 drives after storing delivery articles 50, the mobile object 40 could consume more energy during driving as the delivery articles 50 are heavier. Also, the energy consumption when acceleration occurs in the mobile object 40 could be greater as the center of gravity of the delivery articles 50 is higher. Acceleration can occur in the mobile object 40 when, for example, the mobile object 40 starts moving or when the mobile object 40 goes around a curve. As a result of the higher energy consumption of the mobile object 40, the state of the battery 48 in the mobile object 40 can quickly deteriorate. The mobile object 40 can be considered to be affected by the size, weight, and the like of the delivery articles 50. The controller 12 may generate a candidate route for the mobile object 40 to drive based on information about the delivery articles 50. The controller 12 may estimate the timing at which maintenance, such as charging or replacing the battery 48, will become necessary assuming that the mobile object 40 has driven the generated candidate route. The controller 12 may generate the driving route based on the estimation results.

In a case in which the mobile object 40 delivers delivery articles 50, the energy consumption due to driving of the mobile object 40 could increase as the distance to be driven is longer. The energy consumption due to driving of the mobile object 40 could also increase as the elevation difference of the driving route is greater. The controller 12 may generate a driving route based on the distance to be driven or the elevation difference in a case in which the mobile object 40 delivers the delivery articles 50.

The mobile object may collect articles. The mobile object may, for example, be used to collect waste. The controller 12 may generate a driving route for the mobile object 40 to enable the mobile object 40 to collect waste efficiently. Specifically, the controller 12 may generate a driving route for the mobile object 40 based on a detection result of a sensor that detects the presence or quantity of waste at a location where the waste is accumulated (disposal site). The controller 12 may generate a driving route for the mobile object 40 based on an estimated timing at which the waste is placed out for collection (for example, the day of the week or time of day).

<Example Procedures for Information Processing Method>

As described above, the information processing apparatus 10 generates a driving route for the mobile object 40. The controller 12 of the information processing apparatus 10 may perform the procedures included in the information processing method illustrated in FIG. 3 as procedures for generating a driving route for the mobile object 40. The information processing method may be implemented as an information processing program to be executed by the controller 12. The information processing program may be stored on a non-transitory computer readable medium.

The controller 12 acquires information about the area in which the mobile object 40 is to drive (step S1). The controller 12 generates a candidate route for the mobile object 40 to drive (step S2). The controller 12 acquires information about people in the range of influence that includes the candidate route (step S3).

The controller 12 determines whether a candidate route satisfies a condition based on information about people in the range of influence (step S4). Specifically, the controller 12 may estimate the effect on the mobile object from people under the assumption that the mobile object 40 drives on the candidate route. The controller 12 may determine whether a candidate route satisfies the condition based on the result of estimating the effect.

In a case in which the candidate route does not satisfy the condition (step S4: NO), the controller 12 returns to the procedure of step S2 and starts over from the generation of the candidate route. In a case in which the candidate route satisfies the condition (step S4: YES), the controller 12 generates the driving route by determining the candidate route as the driving route (step S5). After performing the procedure of step S5, the controller 12 can end the execution of the procedures in the flowchart of FIG. 3.

The controller 12 may generate a plurality of candidate routes in step S2 and make a determination for each candidate route in step S4.

The controller 12 may perform the procedures included in the information processing method illustrated in FIG. 4 as procedures for evaluating a candidate route. Specifically, FIG. 4 illustrates the procedures for determining whether a candidate route satisfies a condition, taking into consideration the state of the battery 48 in the mobile object 40.

The controller 12 acquires driving data on the mobile object 40 (step S11). The controller 12 acquires state data on the battery 48 in the mobile object 40 (step S12). The controller 12 estimates the state of the battery 48 in a case in which the mobile object 40 were to drive on a candidate route (step S13). The controller 12 generates the driving route based on the result of estimating the state of the battery 48 (step S14). Specifically, the controller 12 may determine that a candidate route satisfies the condition and determine the candidate route as the driving route in a case in which, according to the result of estimating the state of the battery 48, the battery 48 is capable of maintaining the state required to drive the mobile object 40. After performing the procedure of step S14, the controller 12 can end the execution of the procedures of the flowchart in FIG. 4.

As described above, according to the information processing system 1, the information processing apparatus 10, and the information processing method of the present embodiment, the driving route of the mobile object 40 is generated based on information about people in the range of influence that includes the driving route. As a result of the driving route being generated so that the mobile object 40 is less susceptible to the influence of people, the mobile object 40 is less likely to be delayed. Furthermore, the load on the mobile object 40 during travel can be reduced. The reduced load reduces the frequency of maintenance of the mobile object 40 and can increase the utilization rate of the mobile object 40. As a result, the convenience of the mobile object can be improved.

While an embodiment of the present disclosure has been described with reference to the drawings and examples, it is to be noted that various modifications and revisions may be implemented by those skilled in the art based on the present disclosure. Accordingly, such modifications and revisions are included within the scope of the present disclosure. For example, functions or the like included in each means, each step, or the like can be rearranged without logical inconsistency, and a plurality of means, steps, or the like can be combined into one or divided.

The invention claimed is:

1. An information processing apparatus comprising a controller configured to:
    generate a travel route for each of a plurality of mobile objects based on first information and second information, the first information regarding people in a range of influence that includes the travel route, and the second information regarding a relationship between travel data on each mobile object and state data on a battery in the mobile object; and
    transmit a control signal to each mobile object, the control signal causing the mobile object to travel on the respective travel route,
    wherein the controller is configured to generate the travel route so as to equalize a state of the battery in each mobile object.

2. The information processing apparatus according to claim 1, wherein the controller is configured to generate the travel route based further on a number of people crossing the travel route.

3. The information processing apparatus according to claim 1, wherein the controller is configured to generate the travel route based further on a number of people approaching the mobile object.

4. The information processing apparatus according to claim 1, wherein the controller is configured to generate the travel route based further on an attribute of people in the range of influence.

5. The information processing apparatus according to claim 1, wherein the controller is configured to estimate a timing for charging or replacing the battery in the mobile object when the mobile object travels on the travel route.

6. The information processing apparatus according to claim 1, wherein the controller is configured to generate the travel route based further on an estimated temperature on the travel route.

7. The information processing apparatus according to claim 1, wherein the controller is configured to transmit a control signal to each mobile object, the control signal causing the mobile object to travel a plurality of times on a route passing through a predetermined area to acquire the second information when the mobile object travels through the predetermined area.

8. The information processing apparatus according to claim 7, wherein the controller is configured to generate the travel route based further on an estimated state of the battery required in a case in which the mobile object delivers an article in the predetermined area.

9. The information processing apparatus according to claim 1, wherein the controller is configured to generate the travel route based further on information about an article to be delivered by the mobile object or to estimate a timing for charging or replacing a battery in the mobile object.

10. The information processing apparatus according to claim 1, wherein the controller is configured to generate the travel route based further on a distance or elevation difference of travel in a case in which the mobile object delivers an article.

11. The information processing apparatus according to claim 1, wherein in a case in which the mobile object collects waste, the controller is configured to generate the travel route based further on a detection result of a sensor at a disposal site or an estimated timing at which the waste is placed out for collection.

12. An information processing method comprising:
   generating a travel route for each of a plurality of mobile objects based on first information and second information, the first information regarding people in a range of influence that includes the travel route, and the second information regarding a relationship between travel data on each mobile object and state data on a battery in the mobile object; and
   transmitting a control signal to each mobile object, the control signal causing the mobile object to travel on the respective travel route,
   wherein the travel route is generated so as to equalize a state of the battery in each mobile object.

13. The information processing method according to claim 12, further comprising generating the travel route based further on an attribute of people in the range of influence.

14. The information processing method according to claim 12, further comprising either generating the travel route based further on information about an article to be delivered by the mobile object or estimating a timing for charging or replacing a battery in the mobile object.

15. The information processing method according to claim 12, further comprising generating the travel route based further on a distance or elevation difference of travel in a case in which the mobile object delivers an article.

16. The information processing method according to claim 12, further comprising generating, in a case in which the mobile object collects waste, the travel route based further on a detection result of a sensor at a disposal site or an estimated timing at which the waste is placed out for collection.

17. A non-transitory computer readable medium storing an information processing program configured to cause an information processing apparatus to:
   generate a travel route for each of a plurality of mobile objects based on first information and second information, the first information regarding people in a range of influence that includes the travel route, and the second information regarding a relationship between travel data on each mobile object and state data on a battery in the mobile object; and
   transmit a control signal to each mobile object, the control signal causing the mobile object to travel on the respective travel route,
   wherein the travel route is generated so as to equalize a state of the battery in each mobile object.

* * * * *